United States Patent [19]

Shawhan

[11] 4,019,148

[45] Apr. 19, 1977

[54] LOCK-IN NOISE REJECTION CIRCUIT

[75] Inventor: Elbert N. Shawhan, West Chester, Pa.

[73] Assignee: Sperry-Sun, Inc., Sugar Land, Tex.

[22] Filed: Dec. 29, 1975

[21] Appl. No.: 644,686

[52] U.S. Cl. .................... 328/167; 307/246; 329/122

[51] Int. Cl.² .......................................... H04B 1/12

[58] Field of Search .......... 328/167, 165; 307/240, 307/246; 329/122, 50

[56] References Cited

UNITED STATES PATENTS

| | | | |
|---|---|---|---|
| 3,532,997 | 10/1970 | Faye | 328/167 X |
| 3,550,023 | 12/1970 | Webb | 328/165 |
| 3,559,081 | 1/1971 | Baudino et al. | 328/167 |
| 3,787,774 | 1/1974 | Tietze | 328/167 |
| 3,904,970 | 9/1975 | Shawhan | 328/167 |

Primary Examiner—John S. Heyman
Attorney, Agent, or Firm—Macka L. Murrah

[57] ABSTRACT

A lock-in filter that may be used to detect an AC data signal in the presence of high level noise signals that may occur in such systems as those used for acoustical telemetry in boreholes includes a pair of parallel capacitors receptive of the data and noise signals and circuitry operating in response to signals in the capacitors for alternately switching the capacitors to receive the noise and data signals in phase with the data signal.

14 Claims, 4 Drawing Figures

LOCK-IN NOISE REJECTION CIRCUIT

BACKGROUND OF THE INVENTION

The invention relates to receiving acoustically telemetered signals and more particularly to receiving such signals in the presence of background noise.

Systems have previously been developed for acoustically telemetering signals in boreholes. Typical of these systems are those disclosed by Applicant in U.S. Pat. Nos. 3,889,228 and 3,930,220 and application Ser. No. 390,833.

Acoustical telemetry systems of which those used in boreholes are illustrative are often characterized by high background noise. In the borehole systems considerable noise is generated by drilling, including that generated by the bit, by rubbing of the drill pipe on the casing, by rotation of the drilling table and by various machines on the platform. The systems referred to above describe the use of repeaters to compensate for signal attenuation in the drill pipe. Each repeater, as well as the surface equipment, employs a receiver that must distinguish telemetered signals from the background noise, which can be as much as 10 times larger in amplitude than the signals.

The systems referred to above employ a receiver that incorporates phase-locked loops to supplement noise rejection of cascaded active filters. In many cases, phase-locked-loops are effective, but noise pulses which characteristically occur in long pipes, can cause damped oscillations in the loop which prevent it from locking on the coherent signal. Furthermore, the voltage controlled oscillators of commercial phase-locked-loop units are designed to "pull" with the input frequency over a range of about ±10 Hz. thereby providing no noise rejection in that range.

In a later application (Ser. No. 441,620), Applicant discloses a noise rejection system in which a pair of storage capacitors are switched into a circuit across the source of alternating signals during respective opposite half cycles of the signal wave. The voltage utilized for switching is obtained from the output of an oscillator which is synchronized by and with the received signal, if such signal is within the pass band of a narrow pass band filter. Frequencies outside the desired pass band are rejected by an active band pass filter with positive feedback to cause a 90° phase shift for frequencies outside the pass band. This system is effective, but in some cases of high noise levels at which it is desired that the receiver operate, it may be subject to overloading.

SUMMARY OF THE INVENTION

In accordance with the invention, noise is rejected from a signal by a pair of switched capacitors that are alternately connected to the source of the signal. The capacitors are switched at the signal data frequency by means of signals taken from the capacitors. Filtration is thus achieved both by switching and by the passive RC technique thereby providing a higher degree of noise rejection.

BRIEF DESCRIPTION OF THE DRAWINGS

The invention may be more fully understood by considering the exemplary embodiments thereof illustrated in the following drawings.

DESCRIPTION OF THE PREFERRED EMBODIMENTS

Figure 1:
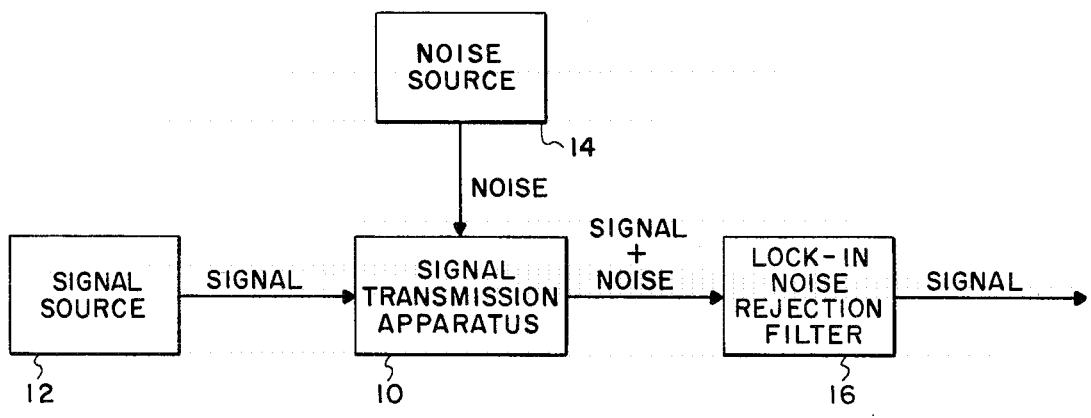
FIG. 1 is a block diagram of a signal transmission system.

The invention may be embodied in a signal transmission system as illustrated in FIG. 1. The system includes a signal transmission apparatus 10 which transmits a signal produced by a signal source 12 from one location to another. During transmission the signals may be intermixed with noise produced by various apparatuses and phenomena which may be generalized by a noise source 14. That which is received at the final destination is a combination of the signal and noise, and before the signal can be utilized the noise must be separated therefrom. This is accomplished by a lock-in noise rejection filter 16 whose output is the unadulterated signal as originally produced by signal source 12.

Figure 2:
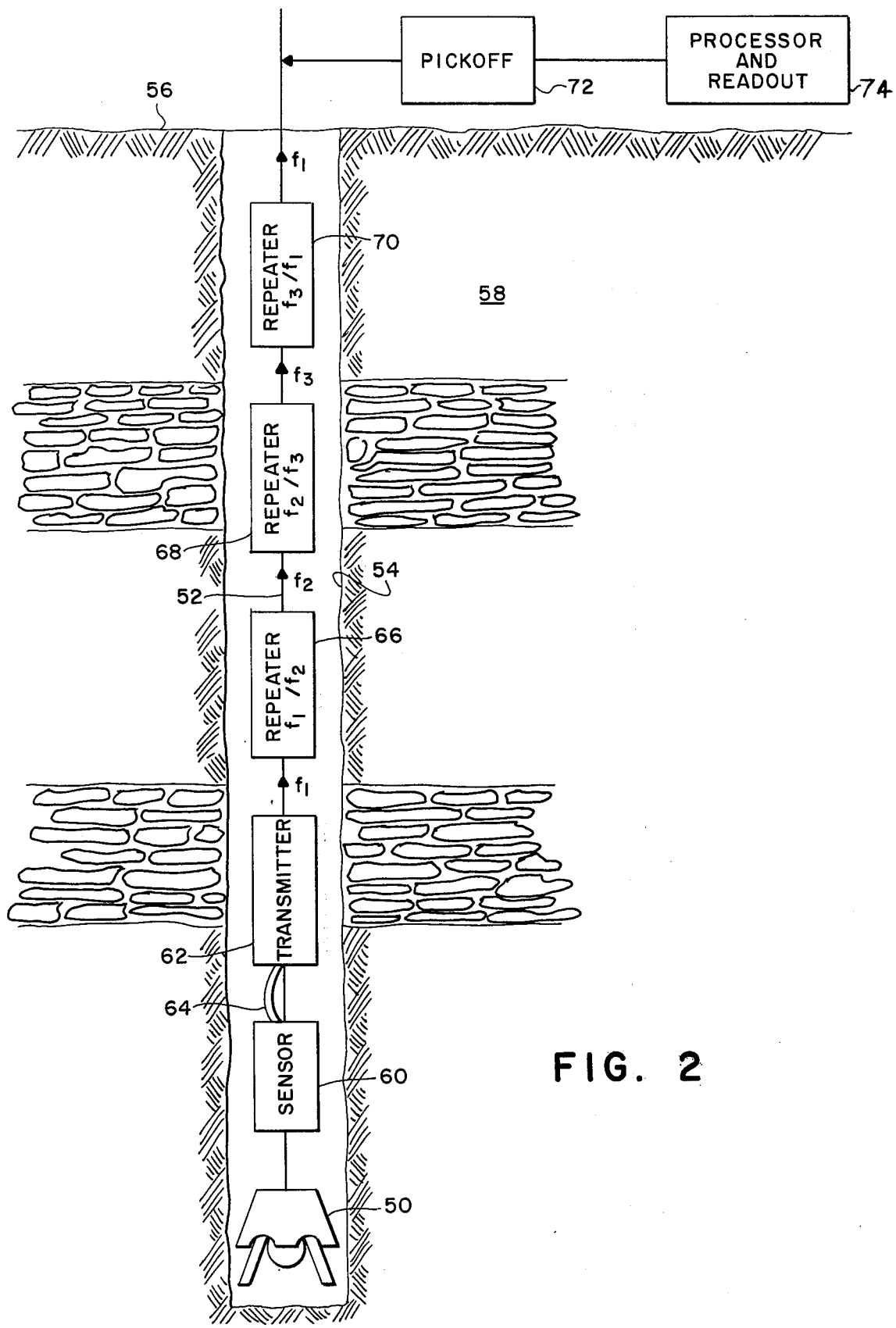
FIG. 2 is a schematic diagram of an acoustical telemetry system for use in boreholes.

The signal transmission system of FIG. 1 may be practically realized in a borehole acoustical transmission system as illustrated in FIG. 2. The telemetry system is incorporated into a conventional drilling apparatus that includes a drill bit 50 and a drill stem 52, which are used to drill a borehole 54 from the surface 56 through earth formations 58.

Information concerning parameters in a borehole is often desirable during drilling to plan further progression of the hole. This can be secured by a sensor 60, or similar device, secured in the drill string. Sensor 60 can, for example, be an orientation sensing device that provides information necessary for directional drilling. This type device would normally be placed in the drill string very near the drill bit 50 as shown in FIG. 2.

Information generated by sensor 60 is usually sent to the surface 56 where it can be evaluated and utilized. One transmission system useful for such purposes is an acoustical telemetry system that uses the drill string 52 as transmission medium. The information is sent along drill string 52 by an acoustical transmitter 62, which receives the information from nearby sensor 60 through an electrical conductor 64, or by other suitable means and method of transmission.

The information is then encoded into an intelligible form that is compatible with the particular form of transmission chosen. For acoustical transmission along drill strings, binary coded data transmitted by frequency-shift-keyed modulation (FSK) has been found suitable. The information concerning borehole parameters is converted from analog or other form to digitally coded words which are used to modulate the FSK system. The FSK system represents digital data by shifting between two frequencies that are relatively close together but distinguishable such as 1060 Hz. and 1080 Hz. One frequency is used to represent a binary 0 and the other to represent a binary 1, and by shifting between the two frequencies in the proper sequence binary words can be represented. The encoded FSK signals can then be used to drive an electro-acoustical transducer, or other suitable device, which induces the desired signals into drill string 52 in the form of acoustical signals.

Acoustical waves suffer attenuation with increasing distance from their source at a rate dependent upon the composition and characteristics of the transmission medium. Many boreholes are so deep that signals sent by transmitter 62 will not reach the surface before they are attenuated to a level at which they are indistinguishable from noise present in the drill string.

In order that the signals reach the surface, they may have to be amplified several times. However, since some waves travel in both directions along the drill string, some method is desirable that will insure that the signals travel in only one direction. Otherwise an amplifier would amplify signals coming from both above and below itself, thereby causing oscillations and rendering the system ineffective. One method that has been found suitable for producing directional isolation uses frequency shifts among three or more nominal frequencies. The pair of frequencies produced by transmitter 62 in the FSK system may be grouped together as a nominal frequency $f_1$. A repeater 66 is capable of receiving nominal frequency $f_1$ is positioned in the drill string above transmitter 62. Repeater 66 alters the FSK signal from nominal frequency $f_1$ to nominal frequency $f_2$. Frequency $f_2$ may comprise a pair of frequencies such as 1260 Hz and 1280 Hz.

The signal at frequency $f_2$ is sent along drill string 52 and is received by a repeater 68 which will receive only signals of nominal frequency $f_2$. Repeater 6 then transforms the signal to nominal frequency $f_3$ and retransmits it. The signal of frequency $f_3$ travels in both directions along drill string 52, but it can be received only be a repeater 70, which receives at $f_3$ and retransmits at $f_1$. The signal cannot be received by repeater 66 since it will receive only $f_1$. In this manner, directionality is assured using three frequencies if alternate repeaters are further apart than the distance necessary for the signal to attenuate to an undetectable level.

A sufficient number of repeaters to transmit the signal to the surface is used, repeating the sequence established by repeaters 66, 68 and 70 until the surface is reached. In FIG. 2 only three repeaters are shown, although a larger number may be used. In the system of FIG. 2, repeater 70 performs the final transmission to the surface at $f_1$. At the surface a pick-off 72, which includes a receiver similar to that used in the repeaters, detects the signal in drill string 52. The pick-off sends the signal to a processor and readout device 74, which decodes the signal and places it in a usuable form.

During transit along drill string 52, the signal is mixed together with noise generated primarily by the drilling apparatus. At each point where the signal is received, i.e., in each repeater and in the surface pick-off, it is desirable that the signal be distinguished and separated from the noise. It is at these places where the lock-in noise rejection circuit is particularly applicable.

Figure 3:
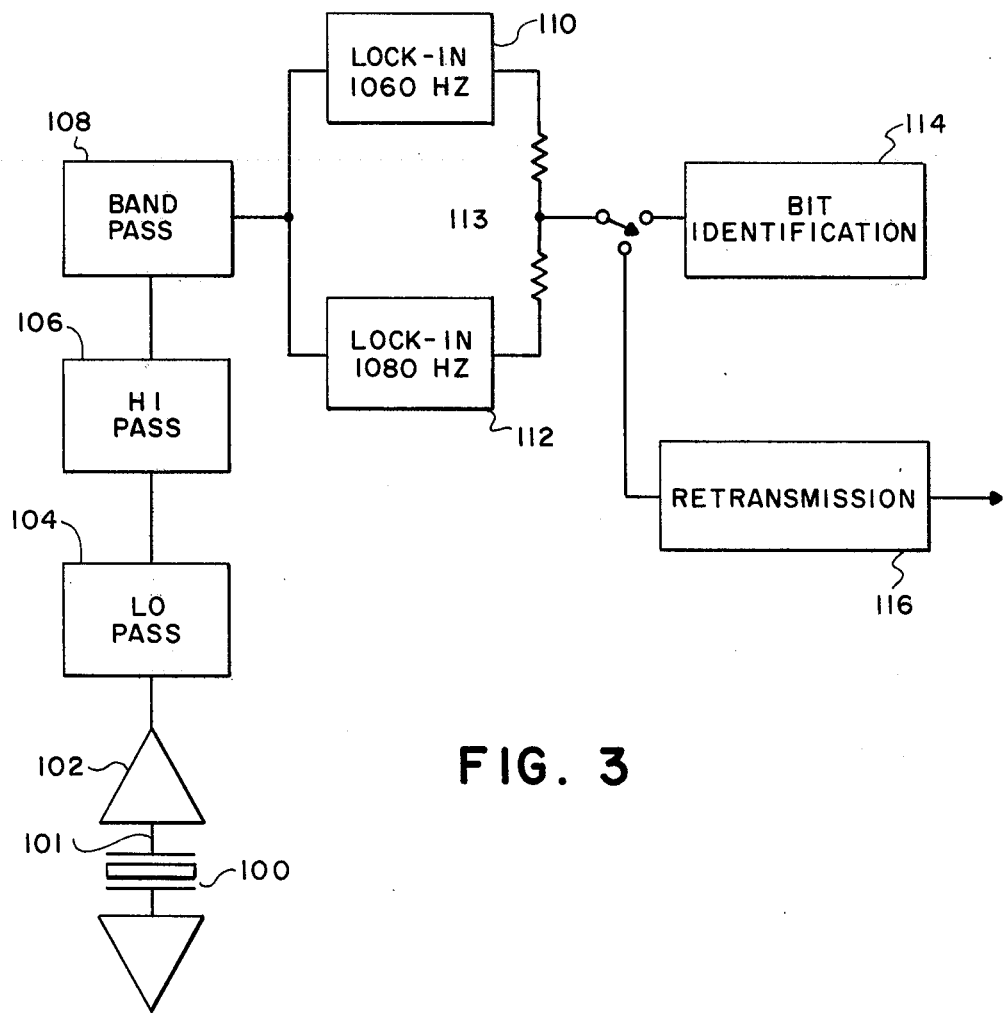
FIG. 3 is a schematic diagram of a noise rejection circuit that may be used in an acoustical telemetry system of FIG. 2.

The noise rejection circuit is shown in block diagram form in FIG. 3. The signal is detected in the drill string by a sound pickup 100 and is amplified by a preamplifier 102 to raise the signal voltage level above electrical noise on a cable 101 that interconnects the circuit components. Cascaded low-pass and high-pass filters 104 and 106 reduce the noise outside the frequency range to be covered, e.g., 860 Hz to 1280 Hz. A band pass filter 108 selects the particular band desired for a particular repeater or surface receiver from this range.

The signal from the cascaded filters is sent to parallel lock-in filters 110 and 112, herein chosen to be 1060 Hz and 1080 Hz for purposes of illustration. Each lock-in filter detects the presence of signals indicating either a data 0 or 1. The outputs of lock-in filters 110 and 112 are combined at node 113 to form a single sequential data signal.

Recombination at node 113 allows cancellation of identical noise signals emanating from both lock-in filters. From node 113 the data signal can be sent either to a bit identification circuit 114 if the circuit is in the surface receiver or to a retransmission circuit 116 if it is in a repeater.

Figure 4:
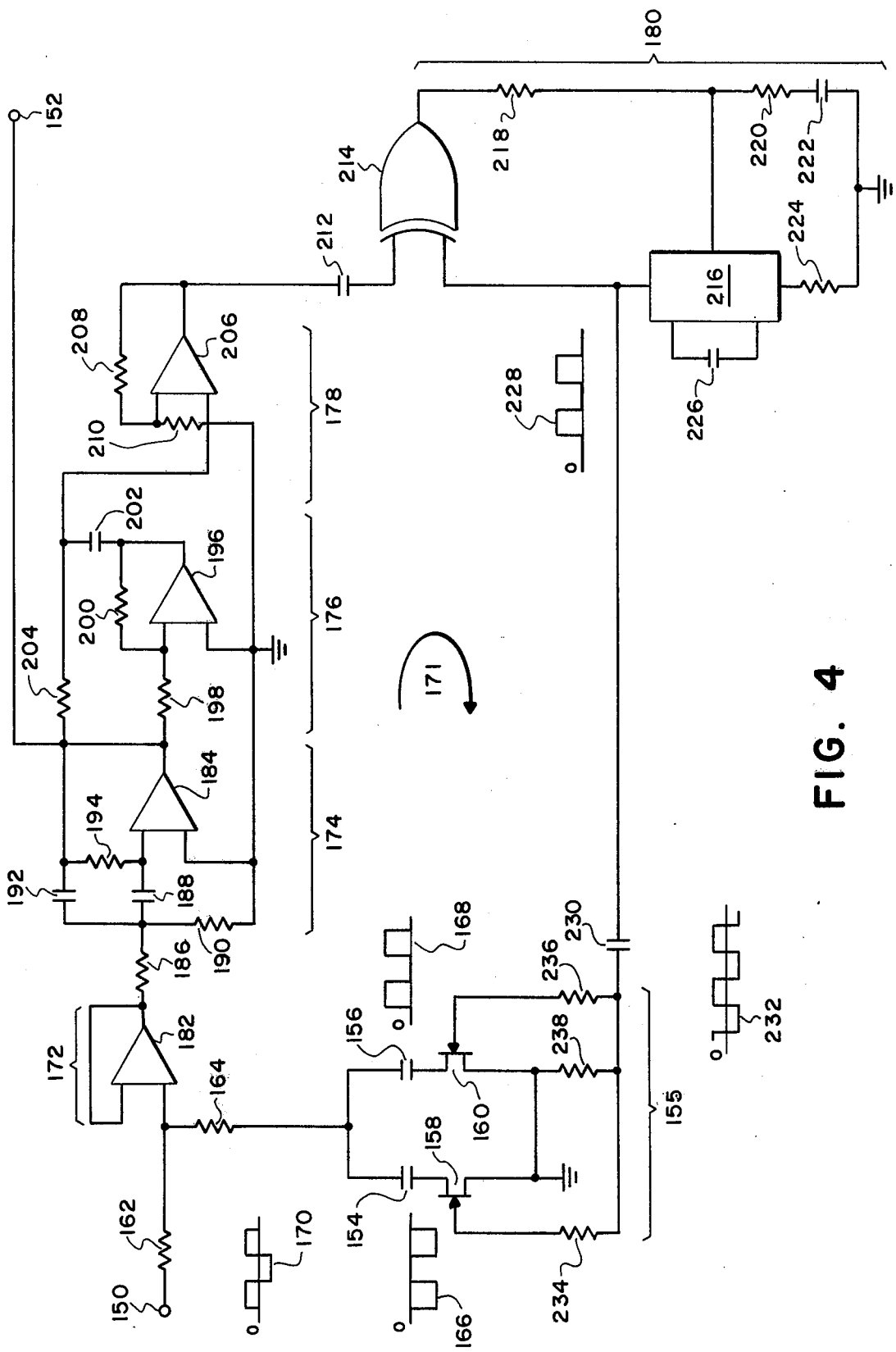
FIG. 4 is a detailed circuit diagram of a lock-in noise rejection circuit that may be used with the system of FIG. 3.

The detailed circuitry that may be utilized in lock-in noise rejection filters 110 and 112 (FIG. 3) is shown in FIG. 4. Unfiltered signals (not shown) which include both periodic AC data components and random noise components enter terminal 150 of the filter, and a clear signal free of noise components is provided at terminal 152 for further use or processing.

The unfiltered signal first enters a switching filter 155 that includes parallel capacitors 154 and 156. The signal enters the switching filter through resistors 162 and 164, which in combination with capacitors 154 and 156 function as a low pass filter and supplement the switching filters. Capacitors 154 and 156 are alternately switched to receive the signal inputted at terminal 150 by N and P type junction field-effect transistors (FET) 158 and 160. The input signal enters the two capacitors 154 and 156 at a rate depending upon the RC time constant for the values chosen for resistors 162 and 164 and capacitors 154 and 156.

Switching filter 155 rejects noise on the basis of the usual randomness of the noise relative to the periodic data component of the input signal. If FET's 158 and 160 are switched at the same frequencies as the periodic AC data signal, one of the capacitors will charge during the negative half-cycle of the periodic AC data signal and the other will charge during the positive half of the same signal. Over a number of cycles, the capacitors charge to a steady-state level. This level depends upon the phase relationship between the switching of FET's 158 and 160 and the periodic data signals, the level being at maximum at 0° phase difference and at zero at 90° phase difference. Failure to maintain 0° phase difference causes at least part of a charge acquired from the positive half of the signals to be cancelled, or discharged, during the negative half of the cycle, maximum cancellation occurring at 90° phase difference.

Noise, however, due to its usual randomness, charges capacitors 154 and 156 in no orderly or periodic fashion. The positive contribution at one instant will likely be cancelled to some extent by a negative contribution at the next. On the average, noise thus contributes little to the charge level of capacitors 154 and 156. The resulting signals associated with switching filters 155 are square waves, waveform 166 appearing on the ground-facing side of capacitor 154, waveform 168 on the ground-facing side of capacitor 156 and waveform 170 appearing between capacitors 154 and 156.

FET's 158 and 160 are operated in response to the periodic AC component of the input signal by circuitry in a feedback loop 171. Loop 171 derives a portion of the periodic AC component between resistors 162 and 164. The signal at this point has been filtered by switching filter 155, thereby eliminating saturation of amplifiers and other maleffects in loop 171 and other circuitry that may occur if the signal were taken directly from input terminal 150. Resistor 164 acts as a load resistor to develop sufficient voltage across the combination of capacitors 154 and 156 to operate the circuitry of loop 171 at all signal levels and times during the cycle of a periodic AC signal component. Initially upon commencement of circuit operation switching filter 155 does not operate and the circuitry of loop 171 depends upon other filtration therein to remove noise. However, this start-up condition lasts only a few cycles of the periodic DC component, after which switching filter 155 begins operation.

The signal derived between resistors 162 and 164 first enters a voltage follower 172 of conventional design using an operational amplifier 182 having a zero resistance feedback loop. Voltage follower 172 provides the high input impedance necessary to prevent drainage of capacitors 154 and 156 and the low output impedance necessary to drive a band pass filter 174 into which the signal then passes.

Band pass filter 174 is of the active variety that utilizes an operational amplifier 184. The signal enters filter 174 from voltage follower 172 through a resistor 186. A capacitor 188 is connected between one input of amplifier 184 and resistor 186. The other input of amplifier 184 is grounded. A resistor 190 connects between ground potential and resistor 186. A portion of the signal exiting from amplifier 184 is fed back through a capacitor 192 to a node between resistors 186 and 190 and capacitor 188, and another portion is fed into the non-grounded input of amplifier 184. This type of filter is well known in the art and is described in detail in "Operational Amplifiers" by Burr-Brown. The amplifier feedback configuration provides the equivalent of an inductance, and the active filter configuration together acts equivalent to an RLC band pass filter. In addition to frequency selectively, filter 174 also provides sharp phase shift characteristics that are desirable in the operation of loop 171. With proper choice of component values, a 90° phase shift can be obtained for as little as a five cycle variation from the filter's center frequency. A phase shift of this magnitude insures proper phasing of the switching signal for FET's 158 and 160 produced by a phase-locked-loop 180, which is discussed hereinafter. The large phase shift is beyond the capability of the phase-locked-loop to vary the output, or "pull", to match it. The operating specifications of filter 174 can be varied by a proper choice of components. The gain of the filter is determined by the value of resistor 186, the center frequency by resistor 190 and capacitors 188 and 192, and the Q by resistor 194 in combination with capacitors 188 and 192.

From band pass filter 174 the signal is sent to a conventional phase shift network 176, which is designed to provide 90° phase shift to compensate for a 90° phase shift in phase-locked-loop 180. The two shifts total 180°, which when coupled with the 180° phase shift of an amplifier 178, provide the equivalent of 0° for loop 171. This allows the switching signal for FET's 158 and 160 to be in phase with the input signals. The signal enters one input of the amplifier 196 in the phase shift network through resistor 198. The other input of the amplifier is set at ground potential. A portion of the output from amplifier 196 is fed back into its non-grounded input through a resistor 200, and another portion is fed back to a node between amplifier 184 and resistor 198 through a capacitor 202 and a resistor 204. The component values are properly chosen to yield the 90° phase shift.

The output of phase shift network 176 is taken between ground potential and the side of capacitor 202 opposite amplifier 196 and is fed into a voltage amplifier network 178, which permits the band pass and phase shift stages to be operated at low signal levels to prevent overloading on high noise peaks. The signals enters one input of an amplifier 206 and a portion of the output signal is fed back into the other input of the amplifier through a resistor 208. In addition, a resistor 210 is connected between ground potential and the amplifier input to which resistor 208 is connected. The amplifier network provides a 180° phase shift as noted hereinabove and a selectable gain determined by a ratio of the value of resistor 208 to the value of resistor 210. The output from voltage amplifier network 178 is fed through a blocking capacitor 212, which removes a DC component from the signal, to a phase-locked-loop 180.

The phase-locked-loop uses an "exclusive-or" frequency discriminator 214 to compare the signal emanating from voltage amplifier network 178 and a signal produced by a voltage-controlled-oscillator (VCO) 216. The output of the frequency discriminator is a DC voltage level that is proportional to the difference in frequency between the aforementioned signals. A DC current flows from frequency discriminator 214 in response thereto through resistors 218 and 220 into a storage capacitor 222, which is tied to ground potential. VCO 216 derives its control voltage, the level of which controls within certain limits its output signal frequency, between resistors 218 and 220. The difference between the frequency of the signal emanating from voltage amplifier 178 and that from VCO 216 controls the voltage level in capacitor 222 and thus the control voltage. The control voltage will change until the two frequencies are identical and then will stabilize. The relationship between the rate of change of frequency with the control voltage is determined by resistor 224 and capacitor 226. The rate at which the control voltage changes is determined by the time constant of the combination of resistors 218 and 220 and capacitor 222. Resistor 220 serves to dampen abrupt surges of current from discriminator 214 which occur, for example, when a noise pulse enters the system. The delay provided by the RC time constant associated with the controlled voltages serves at least two desirable functions. First, it prevents VCO 216 from following voltage surges. Second, it maintains a control voltage corresponding to approximately the correct frequency on VCO 216 during an interval when a signal is not being processed by the lock-in filter, as is the case in an alternately operating filter system as illustrated in filters 110 and 112, in FIG. 3.

The output of VCO 216 is a positive-going square wave 228, which is fed through a blocking network that includes capacitor 230 and resistor 238 to produce an AC square wave 232. On the negative portion of the square wave 232 a current flows through a limiting resistor 234 and causes FET 158 to conduct. On the positive half of current flows through resistor 236 causing 160 to conduct.

While particular embodiments of the invention have been shown and described, it is obvious that changes and modifications may be made without departing from the spirit and scope of the invention. It is the intention in the appended claims to cover all such changes and modifications.

The invention claimed is:

1. Circuit for locking in on an alternating current signal comprising: means receptive of the alternative current signal; a pair of storage capacitors; resistor isolation means between the receptive means and the capacitors; and feedback means connected between the isolation means and said capacitors responsive to signals from the capacitors for connecting one of the capacitors to the alternating current signal during positive half cycles of said alternating current signal and connecting the other of said capacitors to said alternating current signal during the negative half of the cycles of said signal.

2. The circuit of claim 1 wherein the connecting means comprises: switch means; and means for operating the switch means.

3. The circuit of claim 2 wherein the switch operating means comprises: oscillator means; and means for synchronizing the frequency of the oscillator means with the frequency of the signal from the capacitors.

4. The circuit of claim 3 wherein the synchronizing means comprises a phase-locked-loop.

5. The circuit of claim 4 wherein the switch operating means further includes phase shift means.

6. The circuit of claim 5 wherein the switch operating means further includes filter means.

7. Circuit for locking in on an AC signal, comprising: means receptive of the AC signal; a pair of parallel storage capacitors; resistor isolation means connected between the receptive means and the capacitors; and feedback means connected between the isolation means and said capacitors responsive to signals in the capacitors for communicating the AC signal to one of the capacitors during positive half cycles of said AC signal and to the other of said capacitors during negative half cycles of said AC signals.

8. The circuit of claim 7 wherein the communicating means comprises: switch means; and means for operating the switch means.

9. The circuit of claim 8 wherein the switch operating means comprises oscillator means; and means for synchronizing the frequency of the oscillator means with the frequency of the signal from the capacitor.

10. The circuit of claim 9 wherein the synchronizing means comprises a phase-locked-loop.

11. The circuit of claim 10 wherein the switch operating means further includes phase shift means.

12. The circuit of claim 11 wherein the switch operating means further includes filter means.

13. A lock-in circuit for detecting an AC signal voltage, comprising: a pair of capacitors chargeable by the AC voltage and having a common terminal; switch means for connecting an AC voltage to either of the capacitors; and feedback means responsive to an AC voltage at the common terminal for operating the switch means in synchronism with said voltage at said terminal.

14. A circuit for filtering an AC signal from a noise-infested signal appearing across a pair of terminals, comprising: switch filter means connected between the terminal pair, said switch filter means including a pair of capacitors receptive of the noise-infested signal at a first of the terminal pair; switch means for connecting either of the capacitors to the second of the terminal pair; and feedback means responsive to signals in the pair of capacitors for controlling the switch means.

* * * * *